US008319768B2

(12) United States Patent
Yokota

(10) Patent No.: US 8,319,768 B2
(45) Date of Patent: Nov. 27, 2012

(54) DATA LINE DRIVING CIRCUIT FOR LIQUID CRYSTAL DISPLAY DEVICE AND METHOD FOR CONTROLLING THE SAME

(75) Inventor: Junya Yokota, Kanagawa (JP)

(73) Assignee: RENESAS Electronics Corporation, Kawasaki-shi, Kanagawa (JP)

( * ) Notice: Subject to any disclaimer, the term of this patent is extended or adjusted under 35 U.S.C. 154(b) by 554 days.

(21) Appl. No.: 12/585,391

(22) Filed: Sep. 14, 2009

(65) Prior Publication Data

US 2010/0085346 A1 Apr. 8, 2010

(30) Foreign Application Priority Data

Oct. 7, 2008 (JP) ................................ 2008-260288

(51) Int. Cl.
*G06F 3/038* (2006.01)

(52) U.S. Cl. ............................ 345/211; 345/94; 345/95

(58) Field of Classification Search .................... 345/94, 345/95, 211, 212, 213, 214
See application file for complete search history.

(56) References Cited

U.S. PATENT DOCUMENTS 5,528,256 A 6/1996 Erhart et al.
5,852,426 A 12/1998 Erhart et al.
2006/0279514 A1* 12/2006 Yokota et al. ................ 345/100
2008/0074377 A1* 3/2008 Fujita ............................ 345/96
2008/0100603 A1 5/2008 Matsuda et al.
2008/0238843 A1* 10/2008 Yatabe ........................... 345/87
2008/0266217 A1* 10/2008 Kim ............................... 345/87

FOREIGN PATENT DOCUMENTS

CN 101174398 A 5/2008
JP 9-504389 4/1997
KR 20080012541 A * 2/2008

OTHER PUBLICATIONS

Chinese Office Action dated May 14, 2012 (with an English Translation).

* cited by examiner

*Primary Examiner* — Adam R Giesy
(74) *Attorney, Agent, or Firm* — McGinn IP Law Group, PLLC

(57) ABSTRACT

A data line driving circuit for a liquid crystal display device comprising: a plurality of first data lines applied with a positive potential, a plurality of second data lines applied with a negative potential, comparison units that compare with a reference voltage at least one of a potential at a first common line connected to the plurality of first data lines and a potential at a second common line connected to the plurality of second data lines, and switches that are controlled so that the first data lines and the second data lines are set to a connection state or an interruption state according to a comparison result by the comparison units.

12 Claims, 4 Drawing Sheets

DATA LINE DRIVING CIRCUIT FOR LIQUID CRYSTAL DISPLAY DEVICE AND METHOD FOR CONTROLLING THE SAME

BACKGROUND

1. Field of the Invention

The present invention relates to a data line driving circuit for a liquid crystal display device and a method for controlling the same.

2. Description of Related Art

Generally, in a matrix type liquid crystal display, pixels are arranged in a matrix form at intersections of scanning lines and data lines in a row direction and a column direction, respectively, and active elements composed of TFTs (thin film transistors) etc. are respectively arranged at each pixel. Gate electrodes of the above-described active elements are connected to the scanning lines, while the data lines are connected to drain electrodes thereof. In addition, one sides of liquid crystal capacitances equivalent to capacitive loads are connected to source electrodes of the active elements, while the other sides of these liquid crystal capacitances are connected to a common electrode line. A scanning line driving circuit and a data line driving circuit are connected to the above-described scanning lines and data lines, respectively.

In the liquid crystal display, a voltage is applied to the liquid crystal capacitances from the data line driving circuit through the active elements respectively arranged at each pixel by scanning the scanning lines in a top-to-bottom order with the scanning line driving circuit. In the liquid crystal display, an alignment of liquid crystal molecules changes according to the voltage applied to the liquid crystal capacitances, and thereby a light transmittance changes.

In a well-known liquid crystal display device, polarity of a voltage applied to liquid crystal capacitances through TFTs from data lines (hereinafter, referred to as a pixel voltage) is inverted for every predetermined period. Namely, pixels are driven on alternating current (AC).

Here, polarity means positive/negative of a pixel voltage based on a voltage at a common electrode line of liquid crystals (Vcom). Namely, a potential higher than the voltage at the common electrode line Vcom is defined as positive, and a potential lower than that negative.

When a fixed voltage is continued to be applied to the liquid crystal capacitances, in the liquid crystals between electrodes of the liquid crystal capacitances, polarization etc. are generated and a physical property thereof is degraded. Hence, the above-described polarity inversion is required to prevent the above-described degradation by driving pixels on AC. Among polarity inversion systems, for example, as for driving the pixels, there have been known a dot inversion driving system that inverts a polarity of a pixel voltage whenever one scanning line is scanned, a two-line dot inversion driving system that inverts the polarity of the pixel voltage whenever two scanning lines are scanned, a column inversion driving system that inverts a polarity of the scanning line for every frame, etc.

In the inversion driving systems, as described above, the voltages applied to the pixel voltages centering on Vcom are driven on AC. Hence, a voltage range to drive becomes larger. These voltages are supplied from the data line driving circuit, and this data line driving circuit consumes a large power for driving a liquid crystal display. Further, along with larger liquid crystal panels and with increased output of the data line driving circuits, increase of power consumption in the data line driving circuit has become remarkable.

As a prior art that reduces this power consumption in the data line driving circuit, Japanese Unexamined Patent Application Publication No. 9-504389 is disclosed. There is shown in FIG. 4 a data line driving circuit 1 disclosed in Japanese Unexamined Patent Application Publication No. 9-504389. As shown in FIG. 4, the data line driving circuit 1 is composed of data columns 11 to 13, output amplifiers 21 to 23, multiplexers 31 to 33, and an external storage capacitor 40. The multiplexers 31 to 33 are connected to liquid crystal capacitances 51 to 53, respectively.

At the time of the polarity inversion in the liquid crystal display, the multiplexers 31 to 33 are separated the output amplifiers 21 to 23 from the liquid crystal capacitances 51 to 53, and the external storage capacitor 40 and the liquid crystal capacitances 51 to 53 are connected to each other. As a result of this, all the data lines connected to the data line driving circuit 1, i.e., the liquid crystal capacitances 51 to 53 are short circuited to a common node 41. The external storage capacitor 40 is connected to the common node 41, and potentials at the respective data lines are averaged to an intermediate level through this external storage capacitor 40. The data line driving circuit 1 drives each data line from this averaged potential to a desired voltage, thereby alleviating burden of the data line driving circuit and reducing the power consumption.

SUMMARY

The present inventors have found a problem as follows. When one scanning line is focused on in column inversion driving, the polarity of the data line is not inverted during one frame. With a technique disclosed in Japanese Unexamined Patent Application Publication No. 9-504389, all the data lines are short circuited. Consequently, with a system disclosed in Japanese Unexamined Patent Application Publication No. 9-504389, when one scanning line is focused on in column inversion driving, an expectation value for a charge recovery level is a ½ VDD level, and after that, a maximum value of a difference among potentials driven by output amplifiers is ½ VDD. This is the same as a maximum value of a difference among potentials driven with the output amplifiers in a case where a capacitor for charge recovery (corresponding to the capacitor 40 in FIG. 4) is not used in the column inversion driving, i.e., where charge recovery is not performed, so that the above-described system is not so effective with respect to power consumption.

One aspect of the present invention is a data line driving circuit for a liquid crystal display device comprising: a plurality of first data lines applied with a positive potential, a plurality of second data lines applied with a negative potential, comparison units that compare with a reference voltage at least one of a potential at a first common line connected to the plurality of first data lines and a potential at a second common line connected to the plurality of second data lines, and switches that are controlled so that the first data lines and the second data lines are set to a connection state or an interruption state according to a comparison result by the comparison units.

Another aspect of the present invention is a method for controlling a data line driving circuit for a liquid crystal display, the circuit comprising a plurality of first data lines applied with a positive potential and a plurality of second data lines applied with a negative potential, wherein at least one of a potential at the first data lines and a potential at the second data lines is compared with a reference voltage, and the first data lines and the second data lines are controlled to be a connection state or an interruption state according to a comparison result.

According to the present invention, a charge recovery level at a first data line applied with a positive potential or a second data line applied with a negative potential can be set to a reference voltage level.

According to the present invention, power consumption of the data line driving circuit during one frame can be reduced by the column inversion driving.

BRIEF DESCRIPTION OF THE DRAWINGS

The above and other exemplary aspects, advantages and features will be more apparent from the following description of certain exemplary embodiments taken in conjunction with the accompanying drawings, in which.

DETAILED DESCRIPTION OF THE EXEMPLARY EMBODIMENTS

First Embodiment of the Present Invention

Hereinafter, a specific first embodiment to which the present invention is applied will be explained in detail with reference to drawings. This first embodiment is an embodiment in which the present invention is applied to a data line driving circuit for a liquid crystal display device. There is shown in FIG. 1 one example of a configuration of a data line driving circuit 101 for a liquid crystal display device 100 according to the present embodiment.

Figure 1:
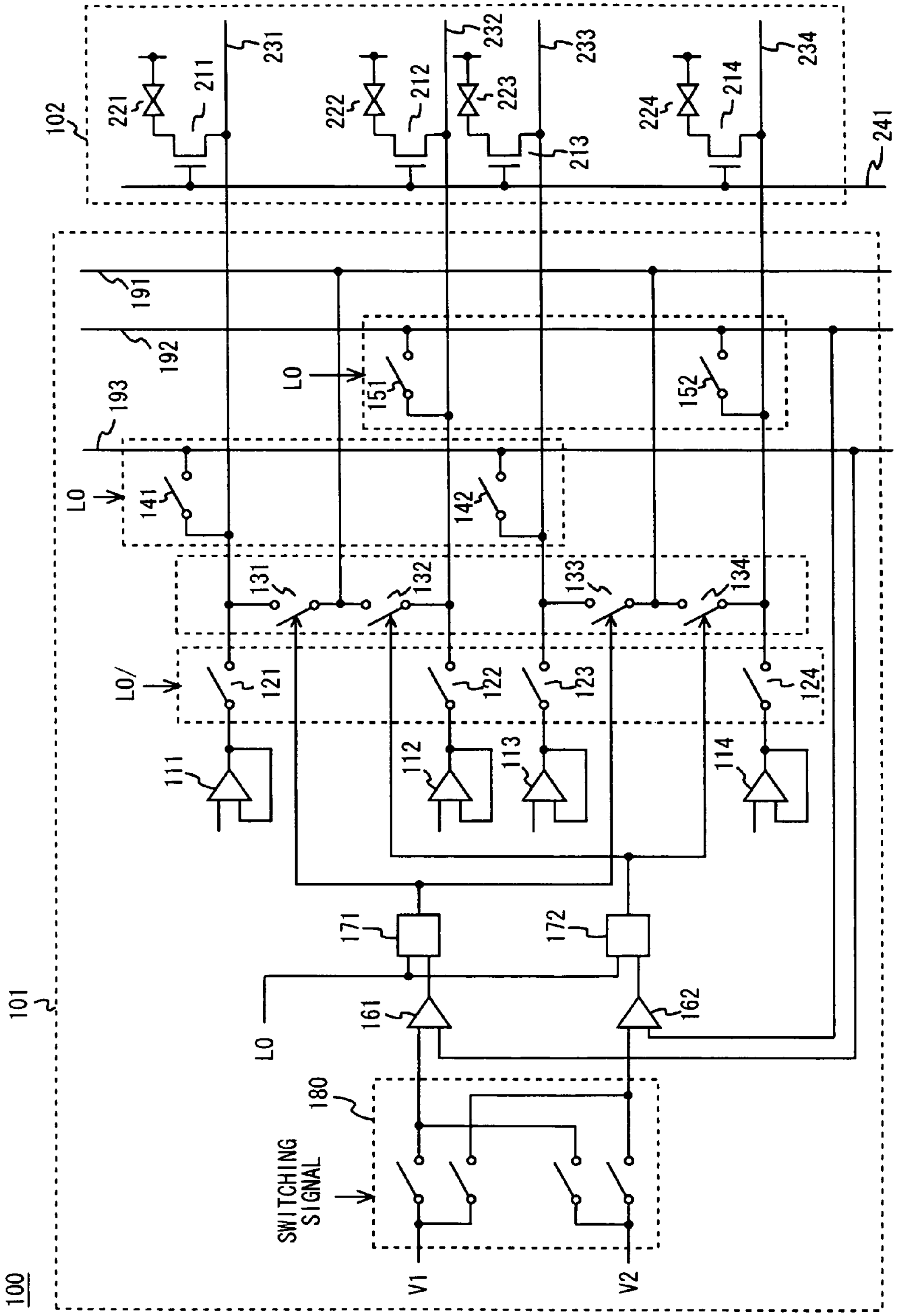
FIG. 1 is a configuration of a liquid crystal display device that has a data line driving circuit according to a first embodiment.

As shown in FIG. 1, the liquid crystal display 100 includes the data line driving circuit 101 and a liquid crystal panel 102. The data line driving circuit 101 includes output amplifiers 111 to 114, output switches 121 to 124, charge recovery switches 131 to 134, odd switches 141 and 142, even switches 151 and 152, comparators 161 and 162, control circuits 171 and 172, and a polarity switch 180. The liquid crystal panel 102 includes thin film transistors (TFTs) 211 to 214 and pixel (liquid crystal) capacitances 221 to 224. Gates of TFTs 211 to 214 are connected to a gate line 241, respectively. Ones of drains or sources of TFTs 211 to 214 are connected to data lines 231 to 234, respectively, while the other ones thereof are connected to one terminals of the pixel capacitances 221 to 224, respectively. Here, data lines 231 and 233 are in charge of odd outputs in the data line driving circuit 101, while data lines 232 and 234 are of even outputs therein. The other terminals of the pixel capacitances 221 to 224 are connected to a common voltage Vcom supply terminal. Note that the gate line 241 is connected to a gate driver (not shown). It is to be noted that the liquid crystal panel 102 in FIG. 1 shows the TFTs and the pixel capacitances only for one scanning line in order to simplify the drawing, and thus, there shall be a plurality of similar configurations in areas not shown.

The output amplifiers 111 to 114 are connected to the data lines 231 to 234 through the output switches 121 to 124, respectively. It is to be noted that voltages output from the output amplifiers 111 to 114 to the data lines 231 to 234 are applied to the pixel capacitances 221 to 224, and transmittance of each pixel changes according to the voltages.

ON or OFF of the output switches 121 to 124 is controlled according to line output signals LO input from an outside. For example, when the line output signal LO is of a high level, the output switches are switched ON, while when a low level, they are OFF.

One terminals of the charge recovery switches 131 to 134 are connected to the data lines 231 to 234, respectively, while the other ones thereof to a common line 191, respectively. ON or OFF of these charge recovery switches 131 to 134 is controlled by the control circuits 171 and 172 described hereinafter.

The odd switches 141 and 142 are connected between an odd common line 193 and the data lines 231 and 233, respectively. ON or OFF of the odd switches 141 and 142 is controlled according to the line output signals LO. For example, when the line output signal LO is of the high level, the odd switches 141 and 142 are switched ON, while when the low level, they are OFF.

The even switches 151 and 152 are connected between an even common line 192 and the data lines 232 and 234, respectively. ON or OFF of the even switches 151 and 152 is controlled according to the line output signals LO. For example, when the line output signal LO is of the high level, the even switches 151 and 152 are switched ON, while when the low level, they are OFF.

One input terminal of the comparator 161 (comparison unit) is connected to the polarity switch 180, the other input terminal thereof to the odd common line 193, and output terminals thereof to the control circuit 171. One input terminal of the comparator 162 (comparison unit) is connected to the polarity switch 180, the other input terminal thereof to the even common line 192, and output terminals thereof to the control circuit 172.

At the polarity switch 180, reference voltages V1 and V2 are input, one of them is output to the comparator 161 according to switching signals, and the other of them is output to the comparator 162.

Here, the switching signals control the polarity switch 180 according to polarities of the data lines 231 and 233 in charge of odd outputs and polarities of the data lines 232 and 234 of even outputs.

For example, when the polarities of the odd outputs (data lines 231 and 233) are positive and those of the even outputs (data lines 232 and 234) negative, the polarity switch 180 is controlled by the switching signals so as to supply the reference potential V1 to the comparator 161 and to supply the reference potential V2 to the comparator 162. On the contrary, when the polarities of the odd outputs (data lines 231 and 233) are negative and those of the even outputs (data lines 232 and 234) positive, the polarity switch 180 is controlled by the switching signals so as to supply the reference potential V2 to the comparator 161 and to supply the reference potential V1 to the comparator 162.

The reference voltage V1 is a positive-level reference potential (positive reference voltage), for example, ¾ VDD. The reference voltage V2 is a negative-level reference potential (negative reference voltage), for example, ¼ VDD. It is to be noted the reference voltage V1 has only to be higher than an average voltage Vcom (for example, ½ VDD) in a case where the data lines 231 to 234 are all connected to the common line 191 and thus potentials thereof are averaged, while the reference voltage V2 lower than the average voltage Vcom.

An output signal from the comparator 161 and a line output signal LO are input into the control circuit 171, and then the circuit outputs a control signal that controls ON or OFF of the charge recovery switches 131 and 133. An output signal from the comparator 162 and the line output signal LO are input into the control circuit 172, and then the circuit outputs a control signal that controls ON or OFF of the charge recovery switches 132 and 134. When the line output signal LO is of a high level, the control circuits 171 and 172 control ON or OFF of the charge recovery switches 131 to 134 according to the output signals from the comparators 161 and 162, respectively. When the line output signal LO is of a low level, the charge recovery switches 131 to 134 are forced to be OFF regardless of the output signals from the comparators 161 and 162.

Here, one example of a control by the comparator 161 and the control circuit 171 will be described. Note that it is assumed that the line output signal LO is of the high level.

When the positive reference potential V1 has been input into the comparator 161, and additionally, potentials at the data lines 231 and 233 are higher than V1, the control circuit 171 outputs a control signal to switch on the charge recovery switches 131 and 133. In addition, when a potential at the data line 232 is lower than V1, the control circuit 171 outputs a control signal to switch off the charge recovery switches 131 and 133.

When the negative reference potential V2 has been connected to the comparator 161, and additionally, the potentials at the data lines 231 and 233 are lower than V2, the control circuit 171 outputs the control signal to switch on the charge recovery switches 131 and 133. In addition, when the potential at the data line 231 is higher than V2, the control circuit 171 outputs the control signal to switch off the charge recovery switches 131 and 133.

In addition, the charge recovery switches 132 and 134 are similarly controlled by the comparator 162 and the control circuit 172. Consequently, as a result, the charge recovery switches 131 and 133 connected to the odd outputs (data lines 231 and 233) are controlled by the line output signal LO and the control circuit 171, while the charge recovery switches 132 and 134 connected to the even outputs (data lines 232 and 234) by the line output signal LO and the control circuit 172.

Figure 2:
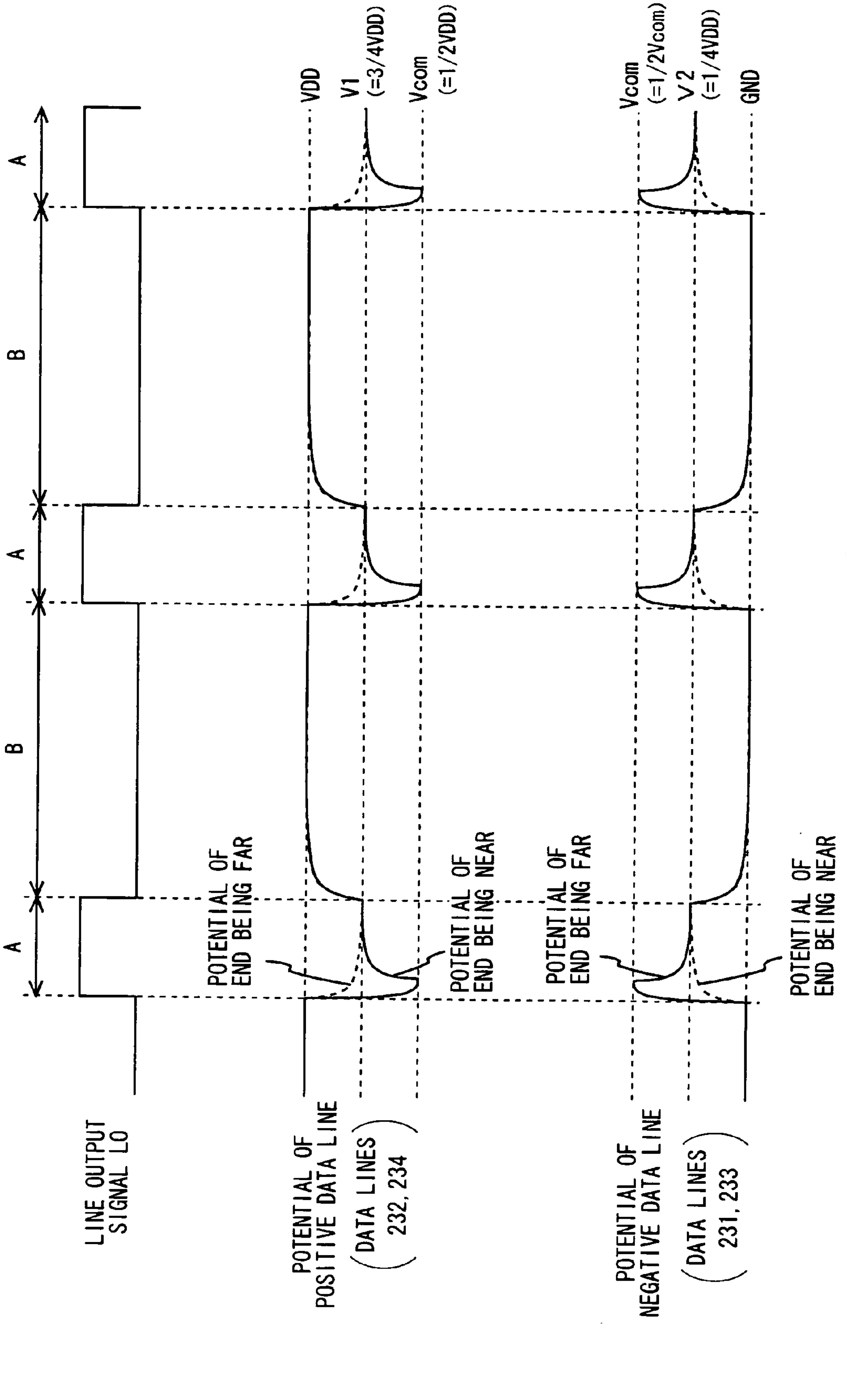
FIG. 2 is a timing chart of an operation of the data line driving circuit according to the first embodiment.

An operation of the data line driving circuit 101 of the first embodiment configured as described above will be explained with reference to FIG. 2. FIG. 2 is a timing chart of the data line driving circuit 101 during one frame. It is to be noted that here will be explained cases where the polarities of the even outputs (data lines 232 and 234) are positive and those of the odd outputs (data lines 231 and 233) negative. Namely, the reference voltage V2 is connected to the comparator 161, while the reference voltage V1 to the comparator 162.

First, an operation in a case where the line output signal LO becomes the high level (period A in FIG. 2) will be explained. First, as an operation 1, since the line output signal LO becomes the high level, the output switches 121 to 124 become OFF, and all the data lines 231 to 234 are separated from the output amplifiers 111 to 114. Further, the odd switches 141 and 142 become ON. Hence, the data lines 231 and 233 are connected to the odd common line 193. Similarly, the even switches 151 and 152 become ON. Hence, the data lines 232 and 234 are connected to the even common line 192.

At this time, the charge recovery switches 132 and 134 in charge of the even outputs become ON since the potentials at the data lines 232 and 234 connected to the even common line 192 are higher than the positive reference potential V1. The charge recovery switches 131 and 133 in charge of the odd outputs become ON since the potentials at the data lines 231 and 233 connected to the odd common line 193 are lower than the negative reference potential V2. As a result of this, all the data lines 231 to 234 are short circuited, and the potentials are begun to be averaged.

Next, as an operation 2, when the potentials at the data lines 232 and 234 in charge of the even outputs connected to the even common line 192 become lower than the positive reference potential V1, the charge recovery switches 132 and 134 connected to the data lines 232 and 234 in charge of the even outputs become OFF. When the potentials at the data lines 231 and 233 in charge of the odd outputs connected to the odd common line 193 become higher than the negative reference potential V2, the charge recovery switches 131 and 133 connected to the data lines 231 and 233 in charge of the odd outputs become OFF.

Next, as an operation 3, when the charge recovery switches 132 and 134 in charge of the even outputs are switched off, potentials at ends of the data lines 232 and 234 connected to the even common line 192, the ends being near the data line driving circuit 101, are lower than the reference potential V1. However, potentials at ends of the data lines 232 and 234, the ends being far from the data line driving circuit 101, do not follow the above-described potentials due to a time constant, but are higher than the reference potential V1. Consequently, the potentials at the ends both near and far from the data lines 232 and 234 are begun to be averaged. Similarly, when the charge recovery switches 131 and 133 in charge of the odd outputs are switched off, potentials at ends of the data lines 231 and 233 connected to the odd common line 193, the ends being near the charge recovery switches 131 and 133, are higher than the reference potential V2. However, potentials at ends of the data lines 231 and 233, the ends being far from the charge recovery switches 131 and 133, do not follow the above-described potentials due to the time constant, but are lower than the reference potential V2. Consequently, the potentials at the ends both near and far from the data lines 231 and 233 are begun to be averaged Next, as an operation 4, the potentials at the ends both near and far from the data lines 232 and 234 in charge of the even outputs are averaged, the potentials at the data lines 232 and 234 connected to the even common line 192 become higher than the reference potential V1, and thereby, the charge recovery switches 132 and 134 become ON again. Similarly, the potentials at the ends both near and far from the data lines 231 and 233 in charge of the odd output are averaged, the potentials at the data lines 231 and 233 connected to the odd common line 193 become lower than the reference potential V2, and thereby, the charge recovery switches 131 and 133 become ON again.

Subsequently, by repeating the operations 2 to 3, as shown in FIG. 2, as for the even outputs, the potentials at the data lines 232 and 234 connected to the even common line 192 can be brought close to the positive reference potential level V1 (¾ VDD), while as for the odd outputs, the potentials at the data lines 231 and 233 connected to the odd common line 193 to the negative reference potential level V2 (¼ VDD).

The above are explanations of the operations in the case where the line output signal LO becomes the high level (period A in FIG. 2). It is to be noted that even though the polarities of the even outputs (data lines 232 and 234) are negative and those of the odd outputs (data lines 231 and 233) positive, similar operations are performed according to the polarity of the each output.

Next, an operation in a case where the line output signal LO becomes the low level (period B in FIG. 2) will be explained. When the line output signal LO supplied from the outside is of the low level (period B), the output switches 121 and 124 become ON. In addition, the charge recovery switches 131 to 134, the odd switches 141 and 142, and the even switches 151 and 152 become OFF. Consequently, a gradation voltage is written in each pixel capacitance 221 through the data lines 231 to 234 from the output amplifiers 111 to 114.

Subsequent periods A and B are operation periods for a next scanning line, and similar operations to the above are repeated at other scanning lines during one frame. It is to be noted that in order to simplify explanations, in FIG. 2, output potentials from the output amplifiers are defined as write voltages not less than ¾ VDD at all the scanning lines of the data lines in charge of the positive outputs. Similarly, they are defined as write voltages not more than ¼ VDD at all the scanning lines of the data lines in charge of the negative outputs.

As in the above explanations of the operations, in the data line driving circuit 101 of the present first embodiment, as for a voltage level at the time of charge recovery at which the data lines 232 and 234 and the data lines 231 and 233 are connected to each other (hereinafter, referred to as a charge recovery level), potentials at the data lines in charge of positive outputs are set to a V1 (¾ VDD) level, while potentials at the data lines in charge of negative outputs a V2 (¼ VDD) level.

As for column inversion driving, during one frame on each scanning line, the data lines in charge of the positive outputs operate in a range of VDD to ½ VDD, while the data lines in charge of the negative outputs ½ VDD to GND. Hence, in a case of the data lines in charge of the positive outputs, the voltages driven by the output amplifiers may fall in a range of mainly ¾ VDD up to ¼ VDD, while in a case of the data lines in charge of the negative outputs, the voltages mainly ¼ VDD up to ¼ VDD. Namely, maximum values in the range of the voltages driven by the output amplifiers are ¼ VDD on both the positive outputs and the negative outputs. Hence, the range of the voltages driven by the output amplifiers is half compared with a case of the prior art, so that chip power consumption can be substantially reduced at the time of driving an LCD panel. Further, as advantages of the narrow range of the driving voltage, there can be obtained speed-up of output delay time in the circuit, and reduction of variation, reduction of an EMI noise, reduction of chip heat generation, etc.

It is to be noted that as is seen from a circuit configuration in FIG. 1, the charge recovery level can be set arbitrarily by changing the reference voltages V1 and V2. However, as mentioned above, it is preferable that the reference voltage V1 is set to a median value in the driving range of the positive data lines, i.e., the ¾ VDD level, while the reference voltage V2 is a median value in the driving range of the negative data lines, i.e., the ¼ VDD level.

Second Embodiment of the Present Invention

Figure 3:
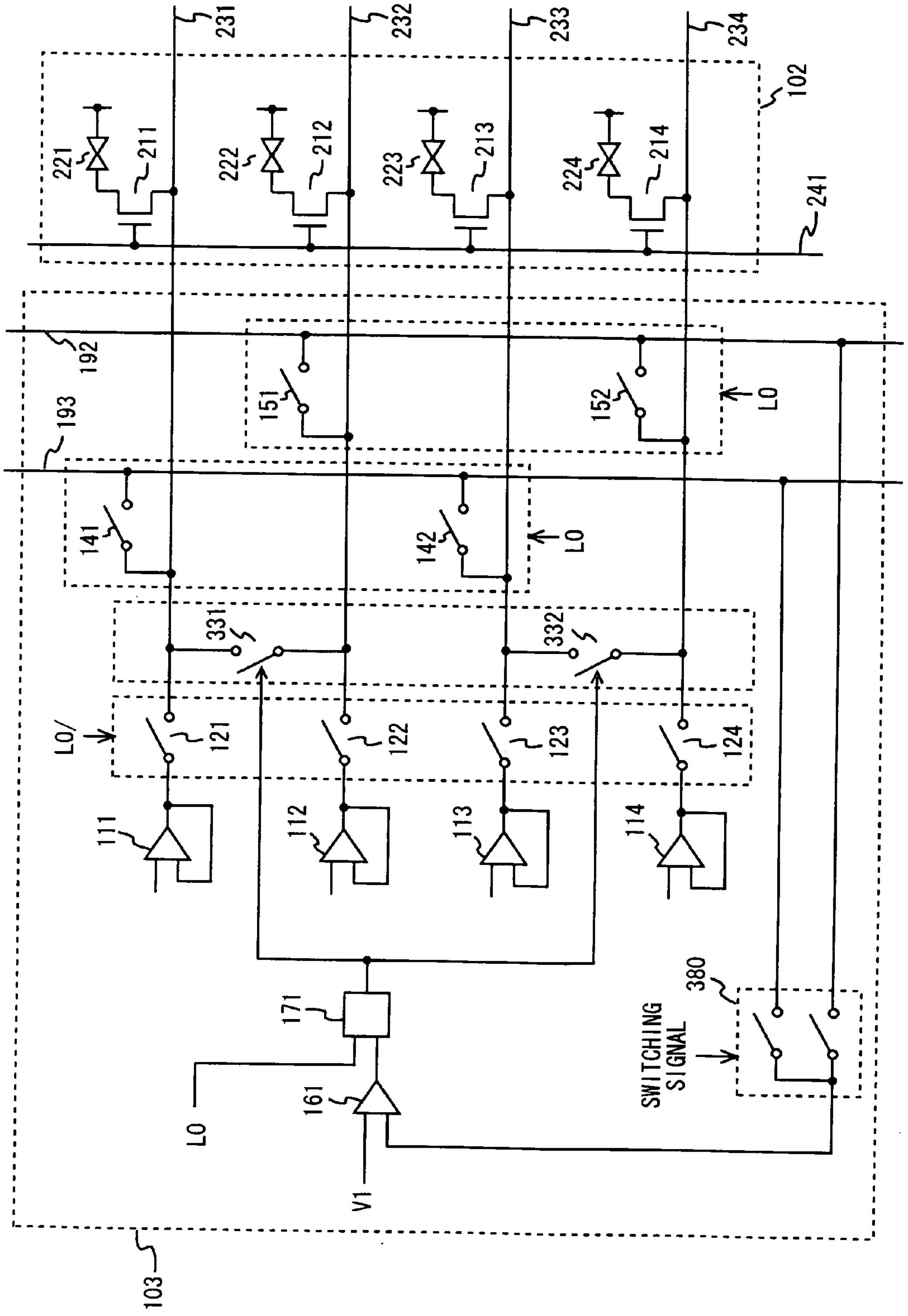
FIG. 3 is a configuration of a liquid crystal display device that has a data line driving circuit according to a second embodiment.
Figure 4:
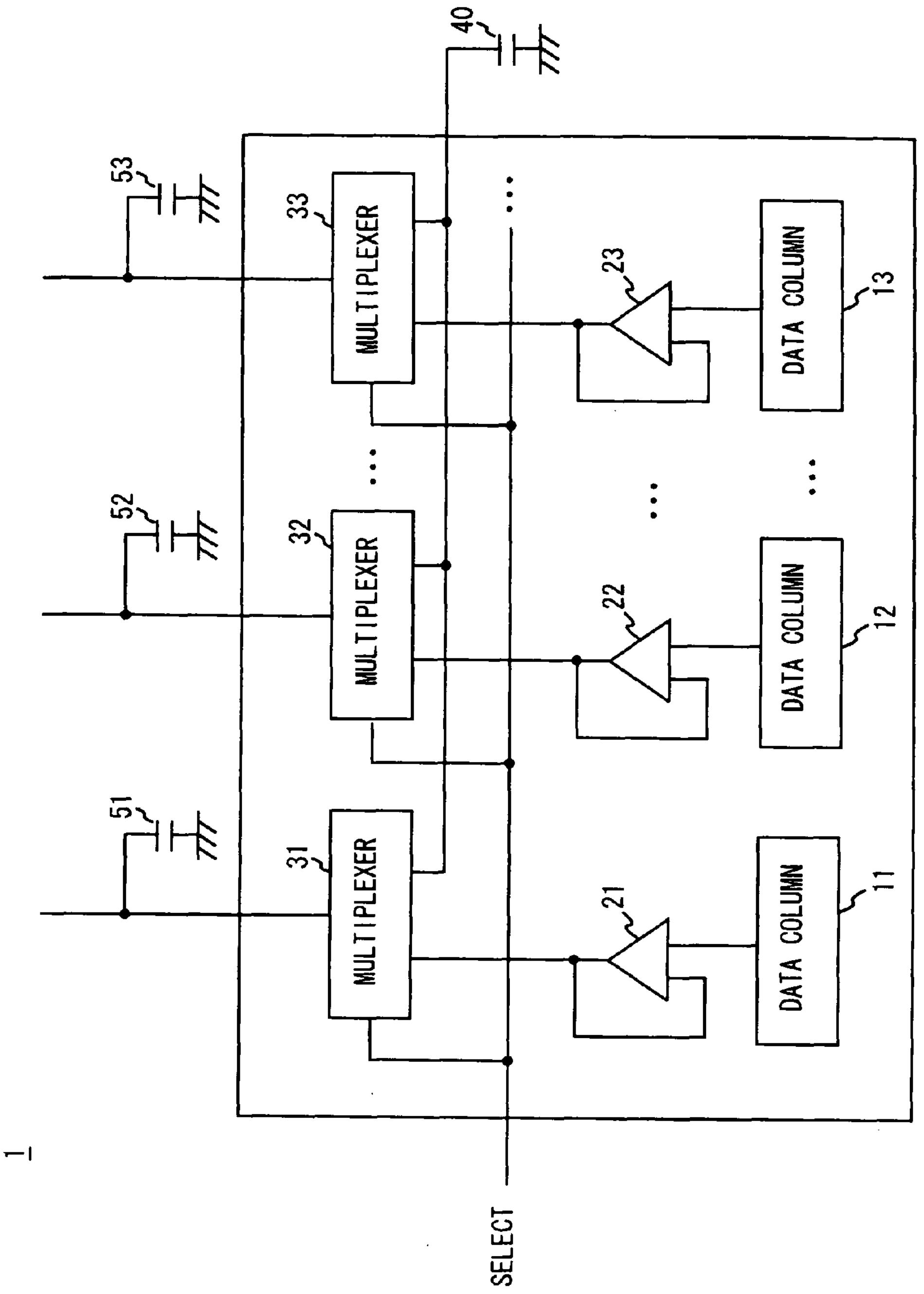
PRIOR ART Fig. 4
FIG. 4 is a configuration of a liquid crystal display device that has a data line driving circuit according to a prior art.

Hereinafter, a specific second embodiment to which the present invention is applied will be explained in detail with reference to the drawings. Similar to the first embodiment, this second embodiment is an embodiment in which the present invention is applied to a data line driving circuit for a liquid crystal display device. There is shown in FIG. 3 one example of a configuration of a data line driving circuit 103 for the liquid crystal display device 100 according to the present embodiment. It is to be noted that explanations on components with the same numbers as in the first embodiment are omitted because they have similar configurations.

As shown in FIG. 3, the data line driving circuit 103 for the liquid crystal display 100 includes the output amplifiers 111 to 114, the output switches 121 to 124, charge recovery switches 331 and 332, the odd switches 141 and 142, the even switches 151 and 152, the control circuit 171, the comparator 161, and a connection switch 380.

Differences from the data line driving circuit 101 of the first embodiment are the charge recovery switches 331 and 332, the connection switch 380, and a connecting configuration thereof. Consequently, here will be mainly explained the above-described differences.

The charge recovery switch 331 is connected between the data lines 231 and 232. In addition, the charge recovery switch 332 is connected between the data lines 233 and 234. ON or OFF of the charge recovery switches 331 and 332 is controlled by a control signal output from the control circuit 171.

The connection switch 380 is connected between both the even common line 192 and the odd common line 193 and an input terminal of the comparator 161. When polarities of the odd outputs (data lines 231 and 233) are positive according to a switching signal, the connection switch 380 connects the input terminal of the comparator 161 with the odd common line 193. On the contrary, when polarities of the even outputs (data lines 232 and 234) are positive, the connection switch 380 connects the input terminal of the comparator 161 with the even common line 192.

One input terminal of the comparator 161 (comparison unit) is connected to a supply terminal that supplies a positive-level voltage, for example, the reference voltage V1 of the ¾ VDD level, while the other input terminal is connected to the connection switch 380.

As mentioned above, the connection switch 380 connects the positive data lines with the comparator 161. Hence, as a result, the comparator 161 outputs a comparison result by comparing potentials at the positive data lines with the reference voltage V1 to the control circuit 171 as an output signal.

The output signal from the comparator 161 and a line output signal LO from an outside of the data line driving circuit 103 are input into the control circuit 171. A control signal according to the output signal from the comparator 161 and the line output signal LO is output to the charge recovery switches 331 and 332.

With the above-described configurations, when voltages at the data lines 231 and 233 or at the data lines 232 and 234 are higher than the reference potential V1, the comparator 161 and the control circuit 171 perform a control to switch ON the charge recovery switches 331 and 332.

An operation of the data line driving circuit 103 of the second embodiment configured as described above will be explained. It is to be noted that here will be explained cases where the polarities of the even outputs (data lines 232 and 234) are positive and those of the odd outputs (data lines 231 and 233) negative. Namely, the supply terminal of the positive-level reference voltage V1 and the even common line 192 via the connection switch 380 are connected to the comparator 161.

First, an operation will be explained in a case where the line output signal LO becomes a high level. First, as an operation 1, since the line output signal LO becomes the high level, the output switches 121 to 124 become OFF, and all the data lines 231 to 234 are separated from the output amplifiers 111 to 114. Further, the odd switches 141 and 142 become ON. Hence, the data lines 231 and 233 are connected to the odd common line 193. Similarly, the even switches 151 and 152 become ON. Hence, the data lines 232 and 234 are connected to the even common line 192.

At this time, the charge recovery switches 331 and 332 become ON since the potentials at the data lines 232 and 234 in charge of the even outputs connected to the even common line 192 are higher than the positive reference potential V1.

As a result, all the data lines 231 to 234 are short circuited, and the potentials are begun to be averaged.

Next, as an operation 2, when the potentials at the data lines 232 and 234 in charge of the even outputs become lower than the positive reference potential V1, the charge recovery switches 331 and 332 become OFF.

Next, as an operation 3, when the charge recovery switches 331 and 332 are switched off, potentials at ends of the data lines 232 and 234 connected to the even common line 192, the ends being near the data line driving circuit 103, are lower than the reference potential V1. However, potentials at ends of the data lines 232 and 234, the ends being far from the data line driving circuit 103, do not follow the above-described potentials due to a time constant, but are higher than the reference potential V1. Consequently, the potentials at the ends both near and far from the data lines 232 and 234 are begun to be averaged Next, as an operation 4, the potentials at the ends both near and far from the data lines 232 and 234 in charge of the even outputs are averaged, the potentials at the data lines 232 and 234 connected to the even common line 192 become higher than the reference potential V1, and thereby, the charge recovery switches 331 and 332 become ON again.

Subsequently, by repeating the operations 2 to 3, the potentials at the data lines 232 and 234 in charge of the even outputs connected to the even common line 192 are brought close to the positive reference potential level V1 (¾ VDD). In addition, the potentials at the data lines 231 and 233 in charge of the odd outputs are brought close to a potential level obtained by subtracting a potential difference between ½ VDD and the positive reference potential V1 from ½VDD (accordingly, the result comes close to ¼ VDD).

A timing chart of the present second embodiment is omitted because it is similar to that of the first embodiment shown in FIG. 2.

Next, an operation will be explained in a case where the line output signal LO becomes a low level. When the line output signal LO supplied from the outside is of the low level, the output switches 121 and 124 become ON. In addition, the charge recovery switches 331 to 332, the odd switches 141 and 142, and the even switches 151 and 152 become OFF. Consequently, a gradation voltage is written in each pixel capacitance through the data lines 231 to 234 from the output amplifiers 111 to 114.

As is seen from the above-described explanations of the operations, the data line driving circuit 103 of the present second embodiment can obtain a similar operation result to the case of the data line driving circuit 101 of the first embodiment.

With the above explanations, the data line driving circuit 103 of the present second embodiment can also obtain similar results and advantageous effects to the case of the data line driving circuit 101 of the first embodiment. Further, the second embodiment has such an advantage that can reduce more number of comparators, control circuits, lines, etc. than in the first embodiment.

It is to be noted that the present invention is not limited to the above-described embodiments, and can be arbitrarily modified without departing from the scope of the subject matter thereof. For example, in the configuration of the data line driving circuit 103 of the second embodiment, a reference voltage input into the comparator 161 may be set to negative-level V2 (¼ VDD). In this case, since the reference voltage changes from V1 to V2 and thus a determination level by the comparator is just changed to the negative electrode level, fundamental operations are similar to those of the second embodiment. In addition, similar advantageous effects can also be obtained to those of the second embodiment. However, the connection switch 380 shall connect the common line of the negative data lines with the comparator 161.

While the invention has been described in terms of several exemplary embodiments, those skilled in the art will recognize that the invention can be practiced with various modifications within the spirit and scope of the appended claims and the invention is not limited to the examples described above.

Further, the scope of the claims is not limited by the exemplary embodiments described above.

Furthermore, it is noted that, Applicant's intent is to encompass equivalents of all claim elements, even if amended later during prosecution.

What is claimed is:

1. A data line driving circuit for a liquid crystal display device comprising: a plurality of first data lines applied with a positive potential, a plurality of second data lines applied with a negative potential, comparison units that compare with a reference voltage at least one of a potential at a first common line connected to the plurality of first data lines and a potential at a second common line connected to the plurality of second data lines, and switches that are controlled so that the first data lines and the second data lines are set to a connection state or an interruption state according to a comparison result by the comparison units, wherein the potential at the first common line is different than a potential at the second common line, and wherein the plurality of first data lines are commonly switched according to the comparison results from the comparison units and the plurality of second data lines are commonly switched and separate from the switching of the first data lines according to the comparison results from the comparison units.

2. The data line driving circuit according to claim 1, wherein when the potential at the first common line is compared with a reference voltage, the comparison units use a positive reference voltage greater than a potential obtained by averaging the potentials at the first and second data lines as the reference voltage.

3. The data line driving circuit according to claim 1, wherein when the potential at the second common line is compared with a reference voltage, the comparison units use a negative reference voltage less than the potential obtained by averaging the potentials at the first and second data lines as the reference voltage.

4. The data line driving circuit according to claim 2, wherein the positive reference voltage is a potential close to a middle value of a driving range of the first data lines.

5. The data line driving circuit according to claim 3, wherein the negative reference voltage is a potential close to a middle value of a driving range of the second data lines.

6. The data line driving circuit according to claim 2, wherein the positive reference voltage is substantially ¾ potential of a power supply voltage.

7. The data line driving circuit according to claim 3, wherein the negative reference voltage is substantially ¼ potential of the power supply voltage.

8. A data line driving circuit for a liquid crystal display device comprising: a plurality of first data lines applied with a positive potential, a plurality of second data lines applied with a negative potential, a first comparison unit that compares with a first reference voltage a potential at a first common line connected to the plurality of first data lines, a second comparison unit that compares with a second reference voltage a potential at a second common line connected to the plurality of second data lines, a first switch that is controlled so that the first data lines and a common node are set to a connection state or an interruption state according to a comparison result by the first comparison unit, and a second switch that is controlled so that the second data lines and the common node are set to a connection state or an interruption state according to a comparison result by the second comparison unit, wherein the potential at the first common line is different than a potential at the second common line, and wherein the plurality of first data lines are commonly switched by the first switch according to the comparison results from the first comparison unit and the plurality of second data lines are commonly switched by the second switch and separate from the switching of the first data lines according to the comparison results from the second comparison unit.

9. The data line driving circuit according to claim 8, wherein the first reference voltage is greater than a potential obtained by averaging the potentials at the first and second data lines, while the second reference voltage is less than the potential obtained by averaging the potentials at the first and second data lines.

10. The data line driving circuit according to claim 8, wherein the first reference voltage is a potential close to a middle value of a driving range of the first data lines, while the second reference voltage is a potential close to a middle value of a driving range of the second data lines.

11. The data line driving circuit according to claim 8, wherein the first reference voltage is substantially ¾ potential of a power supply voltage, while the second reference voltage is substantially ¼ potential thereof.

12. A method for controlling a data line driving circuit for a liquid crystal display, the circuit comprising a plurality of first data lines applied with a positive potential and a plurality of second data lines applied with a negative potential, the method comprising: comparing at least one of a first potential at the first data lines and a second potential at the second data lines with a reference voltage; and controlling the first data lines and the second data lines to be a connection state or an interruption state according to a comparison result from the comparing, wherein the first potential is different than the second potential and, wherein the plurality of first data lines are commonly switched according to the comparison and the plurality of second data lines are commonly switched and separate from the switching of the first data lines according to the comparison during a column inversion driving.

* * * * *